July 8, 1941.  N. M. THOMAS ET AL  2,248,648
PORTABLE STICK HANDLING CARRIER
Filed Feb. 24, 1940  2 Sheets-Sheet 2
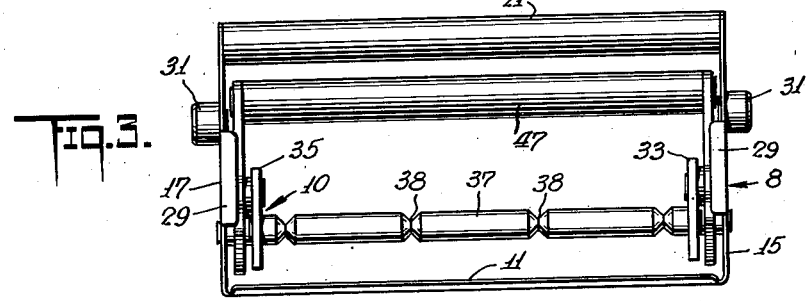
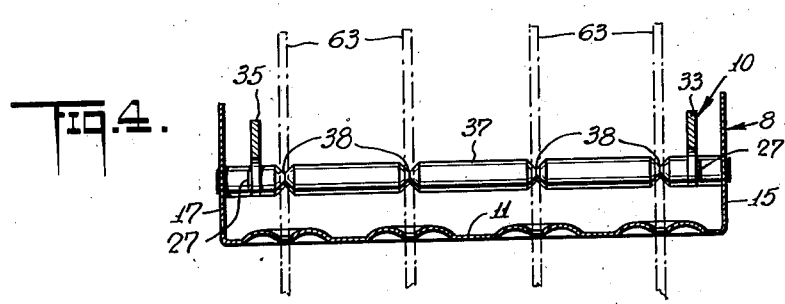
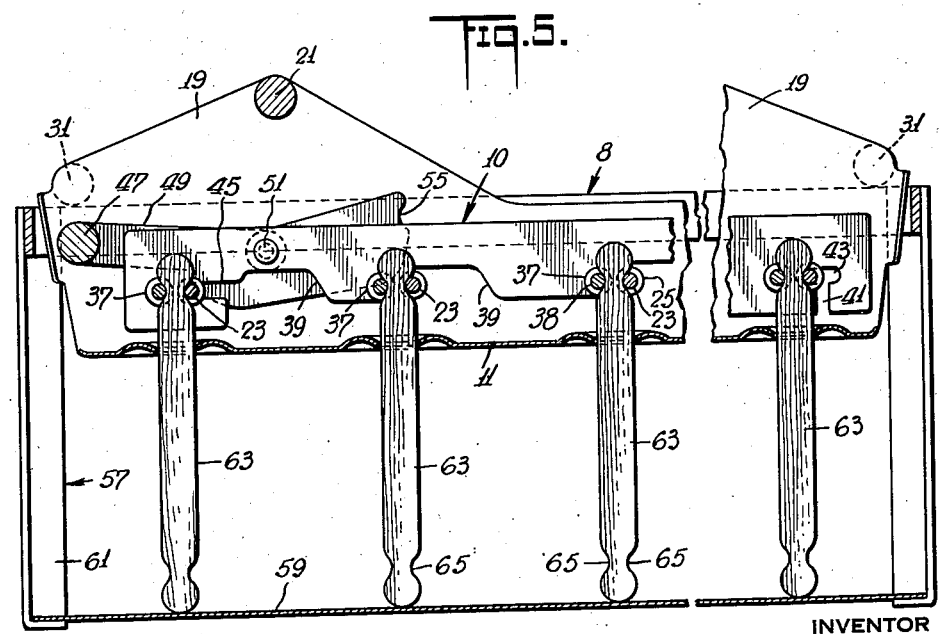
INVENTOR
Norman M. Thomas
Herman Siemund
BY
Richard Cowling
ATTORNEY Patented July 8, 1941

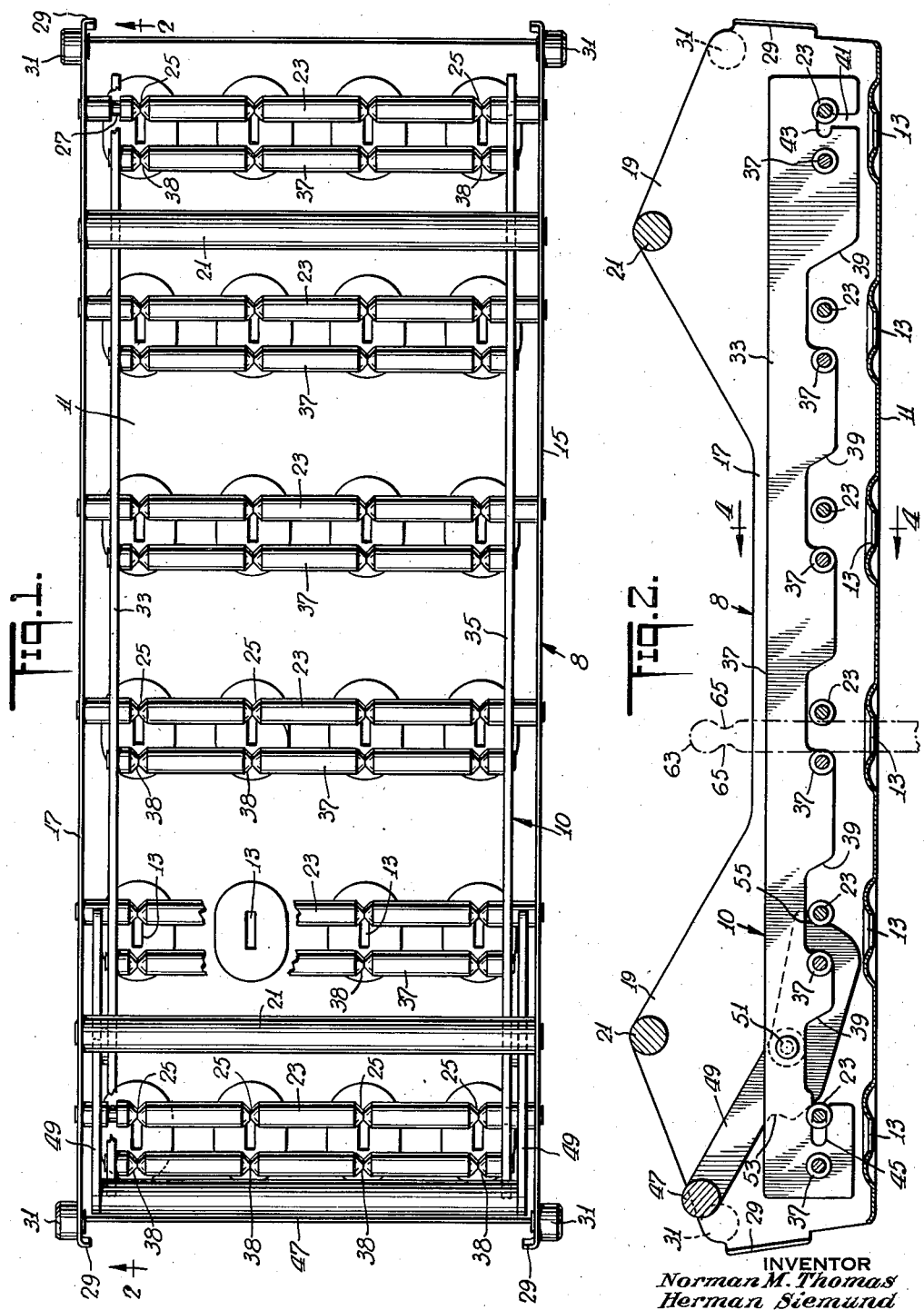

2,248,648

UNITED STATES PATENT OFFICE 2,248,648

PORTABLE STICK HANDLING CARRIER

Norman M. Thomas, Pelham, N. Y., and Herman Siemund, Chicago, Ill., assignors to Joe Lowe Corporation, New York, N. Y., a corporation of Delaware Application February 24, 1940, Serial No. 320,570

21 Claims. (Cl. 294—87)

The present invention relates to improvements in apparatus for simultaneously locking, manipulating and releasing a plurality of handle members, such as wooden handle sticks of the type used extensively in the candy and ice cream industries, in the manufacture of stick confectionery products, and it has particular relation to a portable type of carrier adapted to receive, position, lock, manipulate and release a plurality of such handle members simultaneously in a most efficient, sanitary and economical manner.

Heretofore, it has been the customary practice to use plain flat handle sticks, which could be easily and conveniently manipulated by the types of apparatus shown and described in United States Letters Patent No. 1,966,048, issued July 10, 1934, and No. 2,024,116, issued December 10, 1935. While these apparatus operated entirely satisfactory, it was well known that the wooden handle sticks, because of their cellular structure, changes in moisture contents, etc., tended to vary greatly in size, notwithstanding the precautions taken in their manufacture. With such prior art apparatus the clamping and manipulating ability of the carriers were dependent entirely upon one dimension of the handle members being quite accurate within an established tolerance, being either the width or thickness of the handles depending upon the design of the carrier employed. Frequently in such operations handle members were received that did not come within the prescribed tolerance permitted in their manufacturing dimensions due to changes in size caused by varying climatic conditions. If any handle members were received that did not come within the tolerance allowed, they could not be distinguished from the correct sizes except by their failure to function properly in the carrier. For example, if the handle member was too large, it would prevent the carrier from engaging the other handles positioned therein, and when it was picked up all non-engaged handle members would fall out. If the handle member was too small, the holder would fail to engage it, and the operator would be required to replace it with a handle member of proper size. Such types of apparatus obviously restricted the operator to the use of plain handle members of very accurate dimensions, with a tolerance of only thousandths of an inch either way of a given size, and irregularly shaped handle members, embellished with an attractive, fanciful design could not be used satisfactorily at all because of the difficulty in positioning them in the apparatus and securing them properly therein.

It has been the recent trend of the confectionery industry to use an embellished handle member, wherein the design is formed in the edge of the same. An example of this type of handle member is shown in United States Design Letters Patent No. 102,076, issued November 24, 1936. An advantageous design for a handle member must, of course, be somewhat symmetrical end to end so that it will not require an operator to align them in one direction before positioning them in the carrier. If the design is symmetrical no special attention need be given to the top or bottom end of the handle member. Such designs must also have their embellishments adjacent the ends so that they will be seen and recognized in the trade even though one end thereof is embedded in the confectionery mass. With the adoption of such embellished handle members even greater difficulties were encountered with the portable stick handling carriers of the prior art, because the designs caused variations in the shape and contours of the handle member at about the place of engagement in the apparatus, resulting in more frequent difficulties in securing a plurality of such members therein in a given arrangement as to depth of protrusion below the same. Furthermore, the embellishments must obviously be formed in the shape or contour of the handle members, generally in the form of grooves or notches, because scrolls, etc. on the surface would be entirely too expensive to produce and the projections or embossing would involve a considerable waste of material.

With the present invention, we have provided a simple, inexpensive and durable portable stick handling carrier of a highly sanitary construction, which is especially adapted for holding and positioning a plurality of embellished handle members by utilizing the features of their embellishment, thereby obviating the difficulties involved in producing such handle members within a very limited tolerance to a standard dimension.

An object of the present invention is to provide a simple, inexpensive and durable portable stick handling carrier, which will positively engage and lock a plurality of handle members postioned therein regardless of great variations in their width or thickness dimensions.

Another object of the invention is the provision of a portable stick handling carrier, which will positively engage a plurality of handle members positioned therein without engaging the handle members by biting into or otherwise impaling the same thereon, whereby scratches, perforations or other markings are formed permanently on the surfaces thereof.

A further object of the invention is to provide a simple, inexpensive and durable portable stick handling carrier consisting of two separable members which may be quickly and easily disassembled for cleaning purposes and thereafter readily assembled without requiring the use of any tools, the unloosening or tightening of any screws, bolts or other fastening means, etc. to accomplish the desired result.

Another object of the invention is the provision of a simple, efficient and sanitary portable stick handling carrier consisting of two separable members that are substantially free of inaccessible corners, movable parts requiring lubrication, which can collect and harbor dirt, bacteria, germs, etc., and which are entirely free of mechanisms requiring adjustment, or prevent rapid and thorough cleaning.

Another object of the invention is to provide a simple, practical, rugged and durable portable stick handling carrier which is exceedingly light in weight; capable of convenient operation, assembly and disassembly with little effort by unskilled operators, impossible to jam or otherwise get out of order, devoid of mechanism requiring lubrication; and capable of convenient and thorough cleaning to maintain the high standards of sanitation desired.

A further object of the invention is the provision of a portable stick handling apparatus which is capable of positioning and maintaining a plurality of handle members in spaced relation by engaging a notch or groove forming a part of their embellishing design without impaling, marking or otherwise scratching or injuring the surface of such handle members.

Other and further objects and advantages of the invention reside in the detailed construction of the carrier, which result in simplicity, economy and efficiency, and which will be apparent from the following description, wherein a preferred form of embodiment of the invention is shown, reference being had to the accompanying drawings, forming a part hereof, wherein like numerals indicate like parts, in which:

Fig. 1 is a top plan view of an assembled portable stick handling carrier made in accordance with the principles of our invention;

Fig. 2 is a side elevational view of the assembled carrier shown in Fig. 1, the same being taken along the line 2—2 thereof, and illustrating in dotted line the positioning of a handle member therein;

Fig. 3 is an end elevational view of the apparatus shown in Fig. 1;

Fig. 4 is a cross-sectional view of the apparatus shown in Fig. 2, the same being taken along the line 4—4 thereof, looking in the direction of the arrows, and illustrating in dotted lines the manner in which the handle members are positioned therein; and Fig. 5 is a fragmentary longitudinal sectional view of the apparatus shown in Fig. 1, showing the same positioned over a depth gauging rack, and illustrating the manner in which the even depth to which the handle members project through the apparatus is determined and also illustrating the manner in which the handle members are securely locked within the carrier.

Referring now to the drawings, there is shown in Fig. 1 a portable stick handling carrier consisting of a main or bottom frame structure 8 and a separable top or second frame structure 10, which structures are adapted to be readily assembled or separated for cleaning purposes without the aid of tools of any nature or description whatsoever.

The main or bottom frame structure 8 consists of a U-shaped plate member of integral construction. The bottom 11 of said plate member 8 is provided with a plurality of spaced apertures 13, which, in the arrangement shown, are aligned in four transversely spaced rows, each row consisting of six longitudinally spaced apertures. Of course, any arrangement may be provided, depending upon the desired positioning of the handle members or sticks. Each of the apertures 13 are shown to be of rectangular shape, which is the shape of the handle members to be manipulated by the apparatus, and each of the apertures are made just slightly larger than the handle member to be received. It is apparent that any desired shape of handle member may be handled without departing from the spirit of the invention by varying the shape of the apertures 13 accordingly.

The upwardly projecting sides 15 and 17 of the bottom plate 11 have portions adjacent each end, as indicated at 19, which project beyond the normal height thereof for receiving handle members for manipulating the apparatus. In the construction shown, transversely extending handle members 21 are fixedly mounted between opposite projecting portions 19.

A plurality of transversely extending rods 23 are fixedly secured between the sides 15 and 17 of the main frame structure 8 in a horizontal plane spaced above said bottom plate 11. The rods 23 are so spaced longitudinally of the main frame structure 8 that one extends above each transverse row of apertures 13 adjacent one end thereof, as best shown in Fig. 1. Each rod 23 is provided with a series of similarly spaced radial V-shaped grooves 25, which are so spaced on each rod 23 as to be in substantially vertical alignment with one end of each of the apertures 13 in the bottom plate 11. The two rods 23 at opposite ends of the main frame structure 8 are also provided at each end thereof intermediate their outer grooves 25 and the sides 15 and 17 with a rectangularly shaped groove or notch 27 for receiving the engaging means of the second frame structure when the apparatus is assembled. An intermediate portion of the end walls of the sides 15 and 17 are turned inwardly, as indicated at 29, to provide end flanges to facilitate engagement of the carriers when they are being pushed in an end to end arrangement through a chilling tunnel or other continuous conveyor operation (not shown). A fixed stud 31 is mounted outwardly adjacent the top corner of each end of the sides 15 and 17, which acts as a suspending or spacing means for the portable carrier when the same is positioned over the top of an open-top conventional multi-cavity confection mold structure (not shown).

The separable secondary frame structure 10 consists of a pair of relatively long and narrow rectangular side plates 33 and 35 secured together at spaced longitudinal intervals by a plurality of transversely extending rods 37. The bottom edges of the plates 33 and 35 are indentured as indicated at 39 to allow for the clearance of the rods 23 of the main frame structure when the apparatus is assembled. The side plates 33 and 35 are each provided with upwardly extending vertical slots 41 adjacent one end, and the slots 41 are slightly enlarged at their inner ends, as indicated at 43. The opposite ends of the plates 33 and 35 are each provided with a longitudinally extending slot 45 intermediate its edges which is in open communication with the outer edge of the end indenture 39 of each side plate 33 and 35. Each of the rods 37 of the secondary frame structure 10 are similarly spaced to the rods of the main frame structure, and are provided with a series of spaced V-shaped radial grooves or notches 38 which are spaced transversely of the secondary frame structure 10 so that they are in vertical alignment with one end of the apertures 13 of the bottom plate 11 of the main frame structure when the same is properly positioned thereon and in spaced relation to corresponding rods 23 of the main frame structure 8.

A U-shaped handle member 47 is pivotally mounted between the plates 33 and 35 above the end indenture 39 having the communicating slot 45. The side arms 49 of the handle member 47 are pivotally secured intermediate their ends, as indicated at 51, and are provided a downwardly extending cammed surface 53 along its lower rear edge and an upwardly cammed surface along its front edge of the free outer end, as indicated at 55.

In assembling the two separable frame structures 8 and 10, the secondary or top frame structure 10 is longitudinally inserted between the handles 21 of the main frame structure 8 and the bottom plate 11 with the end having the vertical slots 41 foremost until the longitudinal slots 45 receive and engage the grooves or notches 27 of the back end rod 23. The vertical slots 41, in this position, are immediately over the grooves or notches 27 of the front end rod 23, and may be dropped into place thereover. In this position it will be noted that the rods 37 of the separable secondary frame structure 10 are interposed and interspaced with the rods 23 of the main frame structure 8, and that the radial V-shaped notches or grooves of the respective rods are in longitudinal alignment with each other and substantially in vertical alignment with the apertures 13 of the bottom 11. When in operating position, it will be noted that the rods 37 and 23 are adjacent opposite ends of the apertures when receiving the handle members, and that when the handle members are fixedly secured therein the rods 37 and 23 are directly over a portion of said apertures 13.

While the secondary or top frame structure 10 is being positioned within the main frame structure 8, the pivotal handle 47 is maintained at a slight vertical angle to the horizontal, as in Fig. 2, so that the cammed surface 53 on the free outer end is cammed over the top of the next forward rod 23 of the main frame structure. The enlarged inner surface 43 of the vertical slot 41 and the length of the longitudinal slots 45 permit slight relative movement between said structures without causing disengagement thereof. However, when the pivotal handle 47 is in its raised position, the rods 23 and 37 are widely spaced and adjacent opposite ends of the apertures 13. The portable carrier is now ready to be positioned over a stick gauge 57, which is shown in Fig. 5, consisting merely of a base plate 59 having upstanding ends 61 for supporting the portable carrier a predetermined distance above the plate 57. The handle sticks 63 may be manually or otherwise positioned between the rods 37 and 23 of the respective frame structures 10 and 8 and also through the apertures 13 in the bottom of the latter until their lower ends rest on the top surface of the plate 59. The handle sticks 63 are now in position to be locked in said portable carrier, as their irregular surfaces 65 are positioned between said rods 37 and 23, and this may be accomplished merely by pushing the pivotal handle 47 to a horizontal position, as shown in Fig. 5. In moving the pivotal handle 47 into a horizontal position, it will be noted that the cammed surface 53 rides against the inner side of the end rod 23, as best shown in Fig. 2, and causes the rods 37 of the secondary frame structure 10 to be moved toward the fixed rods 23 of the main frame structure, thereby wedging the handle members 63 between the two juxtaposed rods 37 and 23 at the point of their irregular surface 65. It will be noted that the handles 21 and 47 are so arranged that when the handle 21 is held in the palm of the hand the handle 47 can be grasped and manipulated by the fingers of said hand, and that the movement between the two structures may be accomplished merely by a gripping action between said adjacently positioned handles 21 and 47.

When it is desired to release the handle members from the rods of the respective structures, the operator merely has to squeeze the handles 21 and 47 together. When the pivotal handle 47 is raised, the forward cammed surface 53 engages the back side of the adjacent rod 23 of the main frame structure and forces the secondary structure 10 backwardly until the front edges of the slots 43 and 45 are in engagement with their respective rods 23. In this position, the spacing between the grooved surfaces 25 and 38 of the rods 23 and 37 has been widened sufficiently to permit the handle members 63 to be withdrawn or allowed to drop through the apertures 13 in the bottom plate 11 by gravitational force.

In order to separate the frame structure 10 from the frame structure 8, it is merely necessary to raise the pivotal handle member 47 to open position, lift up the forward end of the top frame structure 10 until the rod 23 is clear of the slot 41, then move the top frame structure back until it is entirely clear of the bottom or main frame structure. Each frame structure may be easily cleaned, or repaired, or replaced, whenever desired, without difficulty and without the aid of any tools of any kind.

Although we have only described in detail one form which our invention may assume, it will be apparent to those skilled in the art that the invention is not so limited, but that various modifications may be made therein without departing from the spirit thereof or from the scope of the appended claims.

What we claim is:

1. A stick handling apparatus including a main frame structure having a plurality of spaced rods arranged in spaced relation to a plurality of spaced means for receiving a plurality of handle members, and a second frame structure having a plurality of spaced rods which are adapted to be interspaced with the rods of the main frame structure, and means for moving said structures relative to one another for varying the spacing between their respective rods.

2. A stick handling apparatus including a main frame structure having a plurality of spaced rods vertically spaced with respect to a plurality of spaced means each adapted to receive a handle member, a second frame structure having a plurality of spaced rods which are adapted to be interspaced with the rods of the main frame structure, and means for moving said structures relative to one another for varying the spacing between their respective rods.

3. A stick handling apparatus including a main frame structure having spaced means for receiving a plurality of handle members and a plurality of spaced rods positioned above said spaced means, a separable second frame structure having a plurality of rods spaced thereon which are adapted to be interspaced with the rods of the main frame structure, and means on one of said structures for engaging a rod of the other structure for securing said structures together.

4. A stick handling apparatus including a main frame structure having spaced means for receiving a plurality of handle members and a plurality of spaced rods positioned above said spaced means, a separable second frame structure having a plurality of rods spaced thereon which are adapted to be interspaced with the rods of the main frame structure when said structures are secured together, and means on one of said structures for engaging a rod of the other structure for securing said structures together, said means permitting relative movement between said structures for varying the distance between their respective rods.

5. A stick handling apparatus including a main frame structure having apertures therethrough for receiving a plurality of handle members and a plurality of spaced rods positioned above said apertures, a separable second frame structure having a plurality of rods spaced thereon which are adapted to be interspaced with the rods of the main frame structure when said structures are assembled, spaced means on one of said structures for engaging the other structure for securing said structures together, and a second means on one of said structures for engaging the other structure to cause relative movement between said structures for varying the distance between their respective interspaced rods.

6. A stick handling apparatus including a main frame structure having upstanding handles for carrying the same, a plurality of spaced rods mounted thereon and a plurality of spaced means positioned below said rods for receiving a plurality of handle members in spaced relation to each other, and a separable second frame structure having a plurality of rods spaced thereon which are adapted to be interspaced with rods of the main frame structure when said structures are assembled, means on one of said structures for engaging the rods of the other structure for securing said structures together, and means on one of said structures adapted to engage the other structure for causing relative movement therebetween to vary the distance between the rods of the respective structures.

7. A stick handling apparatus including a main frame structure having upstanding handles for carrying the same, a plurality of spaced rods mounted thereon and a plurality of spaced means positioned below said rods for receiving a plurality of handle members in spaced relation to each other, and a separable second frame structure having a plurality of rods spaced thereon which are adapted to be interspaced with the rods of the main frame structure when said structures are assembled, means on one of said structures for engaging the rods of the other structure for securing said structures together, and pivotal means including a lever adapted to extend upwardly adjacent an upstanding handle of the main frame structure for causing relative movement between said structures for varying the distance between the respective rods thereof.

8. A stick handling apparatus comprising a main frame structure having handles for manipulating the same, said main frame structure having a plurality of spaced means for receiving a plurality of handle members in spaced relation and having a plurality of widely spaced fixed rods extending above said means, and a separable second frame structure having a plurality of widely spaced fixed rods each of which is adapted to be interspaced adjacent a rod of said main frame structure when said structures are assembled, said second frame structure having means for causing relative movement between said structures for varying the spacing between the adjacent rods of the structures.

9. A stick handling apparatus comprising a main frame structure having handles for manipulating the same, said main frame structure having a plurality of spaced means for receiving a plurality of handle members in spaced relation and having a plurality of widely spaced fixed rods extending above said means, and a separable second frame structure having a plurality of widely spaced fixed rods each of which is adapted to be interspaced adjacent a rod of said main frame structure when said structures are assembled, said second frame structure having means for securing it to the main frame structure, and a second means for causing relative movement between said structures for varying the spacing between the adjacent rods of the structures.

10. A stick handling apparatus comprising a main frame structure having handles for carrying the same, said main frame structure having a plurality of spaced apertures therethrough for receiving handle sticks and having a plurality of spaced rods interposed between said handles and said apertures, a separable second frame structure having a plurality of similarly spaced rods adapted to be interspaced with the rods of the main frame structure so that each rod is in juxtaposition to a rod of the main frame structure when the former is mounted thereon, means for securing said structures together, and pivotal means for actuating said structures to cause relative movement therebetween to vary the distance between each group of juxtaposed rods.

11. A stick handling apparatus comprising a main frame structure having handles for carrying the same, said main frame structure having a plurality of spaced apertures therethrough for receiving handle sticks and having a plurality of spaced rods interposed between said handles and said apertures, a separable second frame structure having a plurality of similarly spaced rods adapted to be interspaced with the rods of the main frame structure so that each rod is in juxtaposition to a rod of the main frame structure when the former is mounted thereon, means on said second frame structure for engaging the rods of the main frame structure for slidably securing said structures together, and a second means on said second frame structure for engaging certain of the rods of the main frame structure for causing relative movement between said structures to vary the spacing between each group of juxtaposed rods.

12. A stick handling apparatus comprising a main frame structure having handles for carrying the same, said main frame structure having a plurality of spaced apertures therethrough for receiving handle sticks and having a plurality of spaced rods interposed between said handles and said apertures, a separable second frame structure having a plurality of similarly spaced rods adapted to be interspaced with the rods of the main frame structure so that each rod is in juxtaposition to a rod of the main frame structure when the former is mounted thereon, means on said second frame structure for engaging the rods of the main frame structure for slidably securing said structures together, and a second means on said second frame structure including a pivotally mounted handle adapted to extend upwardly adjacent a handle of the main frame structure whereby it can be manipulated by the fingers of one hand thereof when said handle of the main frame structure is held in the palm thereof for causing relative movement between said structures to vary the spacing between the rods of each group.

13. A stick handling apparatus comprising a main frame structure having handles for carrying the same, said main frame structure having a plurality of spaced apertures therethrough for receiving handle sticks and having a plurality of spaced rods interposed between said handles and said apertures, a separable second frame structure having a plurality of similarly spaced rods adapted to be interspaced with the rods of the main frame structure so that each rod is in juxtaposition to a rod of the main frame structure when the former is mounted thereon, means on said second frame structure for engaging the rods of the main frame structure for slidably securing said structures together, and a second means on said second frame structure including a cam adapted to engage adjacent rods of said main frame structure for locking said structures in either an open or closed position with respect to said apertures.

14. A stick handling apparatus including a main frame structure having handles for carrying the same, a plurality of spaced rods mounted thereon and a plurality of spaced apertures positioned below said rods for receiving a plurality of handle members in spaced relation to each other, said main frame structure having a plurality of spaced means for supporting the same in spaced relation to the open-top molds of a mold structure, and a separable second frame structure having a plurality of spaced rods thereon which are adapted to be interspaced with the rods of the main frame structure so that a rod thereof is arranged in juxtaposition to a rod of the main frame structure when said structures are secured together, and cam means including a pivotal handle for causing relative movement between said structures whereby the distance between each juxtaposed group of rods is varied to receive, secure and release a handle member therebetween.

15. A stick handling apparatus of the character described including a main frame structure having a plurality of spaced rods, a plurality of spaced apertures arranged in rows below said rods, said rods having a plurality of spaced grooves thereon, a second frame structure having a plurality of spaced rods adapted to be interspaced with the rods of the main frame structure when positioned thereon, said rods of the second frame structure having a plurality of similarly spaced grooves, and means for causing relative movement between said structures for varying the spacing between said interspaced rods.

16. A stick handling apparatus of the character described including a main frame structure having a plurality of spaced rods, a plurality of spaced apertures arranged in rows below said rods, said rods having a plurality of spaced grooves thereon, and a second frame structure having a plurality of similarly spaced rods thereon having a plurality of similarly spaced grooves therein which are adapted to be in alignment when said structures are assembled with their respective rods interspaced and juxtapositioned with respect to one another, and pivotal means for actuating said structures to vary the spacing between said groups of juxtaposed rods for engaging irregularities in the handle members when they are positioned in said apertures.

17. A stick handling apparatus including a U-shaped main frame structure having a plurality of rows of spaced apertures in the bottom thereof and a plurality of spaced rods extending between the upstanding arms of said frame structure, one of said rods being aligned with each row of spaced apertures, a second frame structure having a plurality of spaced rods thereon adapted to be interspaced with the rods of the main frame structure when positioned thereon, one of said rods of the second frame structure being juxtapositioned with a rod of the main frame structure so that the spacing between each group of juxtapositioned rods is in vertical alignment with a row of apertures in the bottom of the main frame structure, and actuating means mounted on the second frame structure including a cam adapted to engage the surfaces of a pair of the spaced rods on the main frame structure for locking said structures in a plurality of positions.

18. A stick handling apparatus including a U-shaped main frame structure having a plurality of rows of spaced apertures in the bottom thereof and a plurality of spaced rods extending between the upstanding arms of said frame structure, one of said rods being aligned with each row of spaced apertures, a second frame structure having a plurality of spaced rods thereon adapted to be interspaced with the rods of the main frame structure when positioned thereon, one of said rods of the second frame structure being juxtapositioned with a rod of the main frame structure so that the spacing between each group of juxtapositioned rods is in vertical alignment with a row of apertures in the bottom of the main frame structure, and actuating means for causing relative movement between said structures for varying the spacing between each group of juxtaposed rods.

19. A stick handling apparatus including a U-shaped main frame structure having a plurality of rows of spaced apertures in the bottom thereof and a plurality of spaced rods extending between the upstanding arms of said frame structure, one of said rods being aligned with each row of spaced apertures, a second frame structure having a plurality of spaced rods thereon adapted to be interspaced with the rods of the main frame structure when positioned thereon, one of said rods of the second frame structure being juxtapositioned with a rod of the main frame structure so that the spacing between each group of juxtapositioned rods is in vertical alignment with a row of apertures in the bottom of the main frame structure, and pivotally actuated means mounted adjacent one end of the second frame structure having a cam for engaging a pair of rods of the main frame structure for causing relative movement between said structures for varying the spacing between the juxtaposed rods of each group for securing a handle member in each of the apertures of the main frame structure.

20. A stick handling apparatus including in combination, a bottom frame structure having a plurality of rows of spaced handle receiving means and a plurality of spaced rods arranged in spaced relation thereto, said rods being so arranged as to position one rod adjacent one edge of each row of spaced handle receiving means, a top frame structure having a plurality of spaced rods which are adapted to be interspaced with the rods of the bottom frame structure when said structures are assembled, said rods of the top frame structure extending along an opposite edge of each row of spaced handle receiving means, and means for moving said rods toward and away from each other and over said handle receiving means.

21. A stick handling apparatus comprising in combination, a bottom frame structure having a plurality of rows of spaced openings therein for receiving handle members and a plurality of spaced rods arranged to position one rod adjacent one edge of each row of openings, a top frame structure having a plurality of spaced rods which are positioned so as to be interspaced with the rods of the bottom frame structure when said structures are assembled, said rods of the top frame structure being arranged so as to position one rod adjacent an opposite edge of each row of openings of the bottom frame structure, and means for moving said structures relative to one another so as to cause said rods to extend from opposite sides over said openings.

NORMAN M. THOMAS.
HERMAN SIEMUND.